United States Patent
Fujii (10) Patent No.: US 7,149,912 B2
(45) Date of Patent: Dec. 12, 2006

(54) CONTROL METHOD AND CIRCUIT FOR STOPPING CLOCK SIGNAL

(75) Inventor: Zenya Fujii, Kakamigahara (JP)

(73) Assignee: Sanyo Electric Co., Ltd., Osaka (JP)

(*) Notice: Subject to any disclaimer, the term of this patent is extended or adjusted under 35 U.S.C. 154(b) by 554 days.

(21) Appl. No.: 10/368,371

(22) Filed: Feb. 20, 2003

(65) Prior Publication Data

US 2003/0163752 A1 Aug. 28, 2003

(30) Foreign Application Priority Data

Feb. 22, 2002 (JP) ............................. 2002-046545

(51) Int. Cl.
*G06F 1/08* (2006.01)
*G06F 1/32* (2006.01)

(52) U.S. Cl. ...................... 713/500; 713/322

(58) Field of Classification Search ............... None
See application file for complete search history.

(56) References Cited

U.S. PATENT DOCUMENTS

| 4,851,987 A | | 7/1989 | Day |
| 5,630,145 A | * | 5/1997 | Chen ........................... 713/322 |
| 5,911,051 A | * | 6/1999 | Carson et al. ............... 710/107 |
| 6,021,506 A | * | 2/2000 | Cho et al. .................... 713/601 |
| 6,125,450 A | * | 9/2000 | Kardach ....................... 713/323 |
| 6,643,792 B1 | * | 11/2003 | Kurosawa ..................... 713/501 |
| 6,745,357 B1 | * | 6/2004 | Chrudimsky et al. ........ 714/726 |
| 6,820,145 B1 | * | 11/2004 | Wingen ......................... 710/52 |
| 6,889,279 B1 | * | 5/2005 | Godfrey ...................... 710/269 |

FOREIGN PATENT DOCUMENTS

| CN | 86108202 | 12/1988 |
| JP | 08-314716 | 11/1996 |

OTHER PUBLICATIONS

Chinese Office Action in corresponding Chinese Application No. 03106065.X dated Aug. 5, 2005.

* cited by examiner

*Primary Examiner*—Lynne H. Browne
*Assistant Examiner*—Anand B. Patel
(74) *Attorney, Agent, or Firm*—McDermott Will & Emery LLP (57) ABSTRACT

When controlling a clock to a central processing unit, it is naturally preferable not to change existing circuits which are not related to the control of the clock. A clock control circuit inputs a clock input CLK, and generates a clock output CLKOUT for the central processing unit. In the clock control circuit, CLK is masked by a write operation to an internal register. CLKOUT is stopped by the mask operation. The mask operation is carefully designed to be initiated when the internal cycle of the central processing unit is detected. The resumption of the clock is initiated by interrupts.

2 Claims, 7 Drawing Sheets

FIG. 1

| PIN NAME | ATTRIBUTE | DESCRIPTION |
|---|---|---|
| CLK | I | CLOCK INPUT |
| CLKEN | I | CLOCK ENABLE |
| nRESET | I | RESET |
| CLKOUT | O | CLOCK OUTPUT |
| nIRQ | I | INTERRUPT REQUEST (FROM INTERRUPT CONTROLLER) |
| nFIQ | I | FAST INTERRUPT REQUEST (FROM INTERRUPT CONTROLLER) |
| ADDR[31:0] | I | ADDRESS |
| WRITE | I | WRITE / READ |
| SIZE[1:0] | I | ACCESS WIDTH |
| TRANS[1:0] | I | TRANSFER TYPE (FROM CPU) |
| WDATA_O | I | WRITE DATA |
| TRANSOUT[1:0] | O | TRANSFER TYPE (TO OUTSIDE) |

FIG. 2

| ADDRESS | BIT | R/W | DEFAULT | REGISTER | DESCRIPTION |
|---|---|---|---|---|---|
| 14003000h | 31-1 | — | — | — | — |
|  | 0 | W | 0 | CKSTOP | CLOCK STOP INSTRUCTION REGISTER |

CONTROL METHOD AND CIRCUIT FOR STOPPING CLOCK SIGNAL

BACKGROUND OF THE INVENTION

1. Field of the Invention

This invention relates to a technique for controlling a clock signal, especially to a method and circuit for stopping a clock signal. This invention is applicable to a control method and circuit for providing a clock to a central processing unit.

2. Description of the Related Art

Enormous improvement has been achieved for central processing units generally called CPU or MPU. The operational frequency of the fastest devices has reached the order of gigahertz. Although the frequency will be higher in future, there is a program that the power consumption of such devices will become greater in relation to the operational frequency as the central processing units are generally formed by MOS devices. Improvement of performance causes increase of power consumption, which reduces battery operation time of products to which the central processing units are applied. To solve this problem, elaborately controlling the clock for the central processing units has been proposed. Low power design is often introduced by reducing the frequency of the clock based on the types of processes executed.

Japanese Laid-Open publication H8-314716 discloses a clock control method in which a clock stop controller, in collaboration with a bus controller, stops the provision of a central processing unit clock signal to the central processing unit core by continuously asserting a bus request signal responding to a write request to a certain address. To resume from the clock stop mode, the controller issues a bus acknowledge response signal responding to a predetermined asynchronous input signal thereby canceling the prohibition state of the central processing unit clock signal.

In the above-mentioned technique, however, it becomes necessary to redesign the bus controller which is originally not related to the control of the clock for the central processing unit. It is naturally desirable to modify or add a circuit directly related to the clock control while leaving other circuits around the central processing unit intact in terms of design efficiency and developing term. It is also desirable not to redesign the central processing unit itself only for the clock control purpose.

SUMMARY OF THE INVENTION

It is therefore an object of the present invention to control the clock for the central processing unit without modifying the unit itself or its peripherals. It is another object to control the clock for central processing units and the like which are designed employing an instruction set without any dedicated instructions such as HALT which can easily stop the clock. It is still another object to avoid undesirable operation when stopping the clock. It is yet another object to resume or restart the clock efficiently.

According to one aspect of the present invention, a clock control circuit connected to a central processing unit providing a clock thereto is provided. The circuit comprises a detector which detects the cycle of the central processing unit to become an internal cycle after the central processing unit has executed an instruction to write in a predetermined address; and a clock output unit which stops the clock to the central processing unit after the detection of said internal cycle.

'An internal cycle' is generally a cycle in which a process is conducted inside the central processing unit. In this description, however, the internal cycle means not only the above-mentioned cycle but also any periods with no external bus access such as an idle state of the central processing unit. 'An instruction' instructs a write in to a predetermined address for example to stop the clock. By this instruction, it becomes easy to stop the clock even when any specific instructions such as HALT to stop the operation of the central processing unit are not provided.

'Write in a predetermined address' may or may not require specific data to be written in the address. When arbitrary data is allowed, the process for stopping the clock is initiated triggered by the write-in operation itself. This aspect of the clock control circuit may be provided with a register which becomes the target for the write-in.

According to this aspect, clock stop control is realized without modifying the central processing unit nor its peripherals.

According to another aspect of the present invention, clock control method to provide a clock from a clock control circuit to a central processing unit is provided. The method comprises detecting a cycle of the central processing unit to become an internal cycle after the central processing unit has executed an instruction to write in a predetermined address; and stopping the clock to the central processing unit after the detection of said internal cycle, wherein the instruction is placed or put in an interrupt handler or routine which is initiated by a software interrupt to the central processing unit.

According to this aspect, a software interrupt can be used as a trigger for stopping the clock of the central processing unit and the whole process becomes easy. Further interrupt may be masked temporarily in the interrupt routine so that any undesirable stop of the clock is avoided during the interrupt processing.

This summary of the invention does not necessarily describe all necessary features so that the invention may also be a sub-combination of these described features.

DETAILED DESCRIPTION OF THE INVENTION

The invention will now be described based on preferred embodiments which do not intend to limit scope of the present invention, but exemplify the invention.

Figure 1:
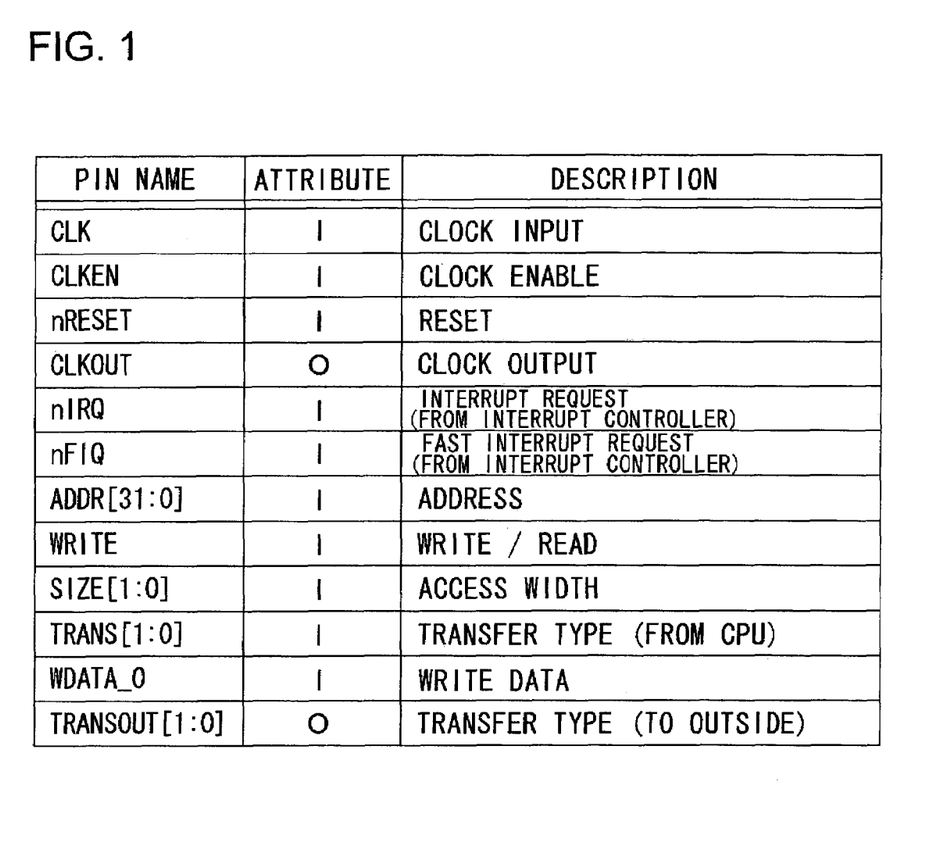
FIG. 1 shows the pin attribute of a clock control circuit according to one embodiment of the present invention.

FIG. 1 shows pin attributes of a clock control circuit according to one embodiment. CLK is a clock input to the circuit. CLKEN is a clock enable signal for the clock output from the circuit. nRESET is an active low reset signal (hereinafter active low signals are represented with 'n'). CLKOUT is a clock output signal for the central processing unit or any other circuits. nIRQ and nFIQ are normal and fast interrupt request signals, respectively. ADDR [31:0] are 32 bits of address input. WRITE is an active high write command. SIZE [1:0] are data access width signals. TRANS [1:0] are 2 bit signals representing transfer types of the central processing unit. WDATA_0 is the bit 0 of a write data. TRANSOUT [1:0] are output signals generated from TRANSOUT [1:0] by the process described later. nFIQ is provided for time-critical interrupt process and is processed with higher priority than nIRQ. Hereinafter, CLKEN and CLKEN_DLY generated delaying CLKEN by one clock are fixed high throughout this description. [31:0], [1:0] and the like may be omitted.

Figure 2:
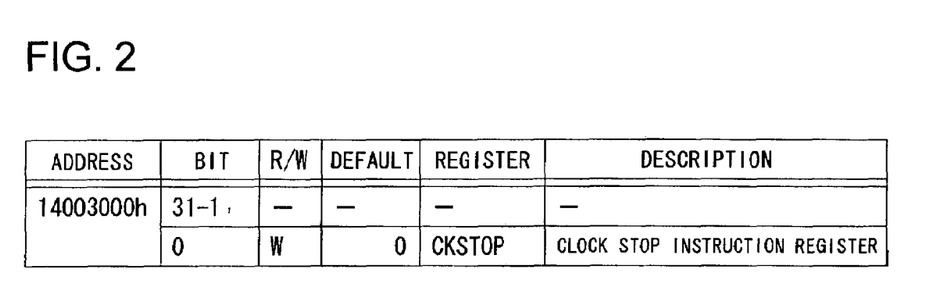
FIG. 2 shows the specification of a clock stop instruction register included in the clock control circuit according to one embodiment of the present invention.

FIG. 2 shows the specification of the 'clock stop instruction register' which is a system register equipped in the clock control circuit. This register is mapped in I/O area with its address being 14003000h. When '1' is written in this register, this action is interpreted as the instruction for stopping the clock. Software interrupt is used as a trigger to stop the clock in this embodiment. The clock control circuit 10 enters an interrupt routine when a software interrupt instruction is executed. 'An instruction to write '1' to the clock stop instruction register' is placed in the beginning part of the routine.

Subsequent interrupts may occur before the clock has stopped while the process of the routine is being appropriately executed. In such a situation, in order to process the interrupt correctly, it is necessary to avoid undesirable stop of the clock caused by a previous software interrupt. For this purpose, any further interrupt should be masked in the beginning portion of the interrupt routine so that further interrupts are blocked.

Figure 3:
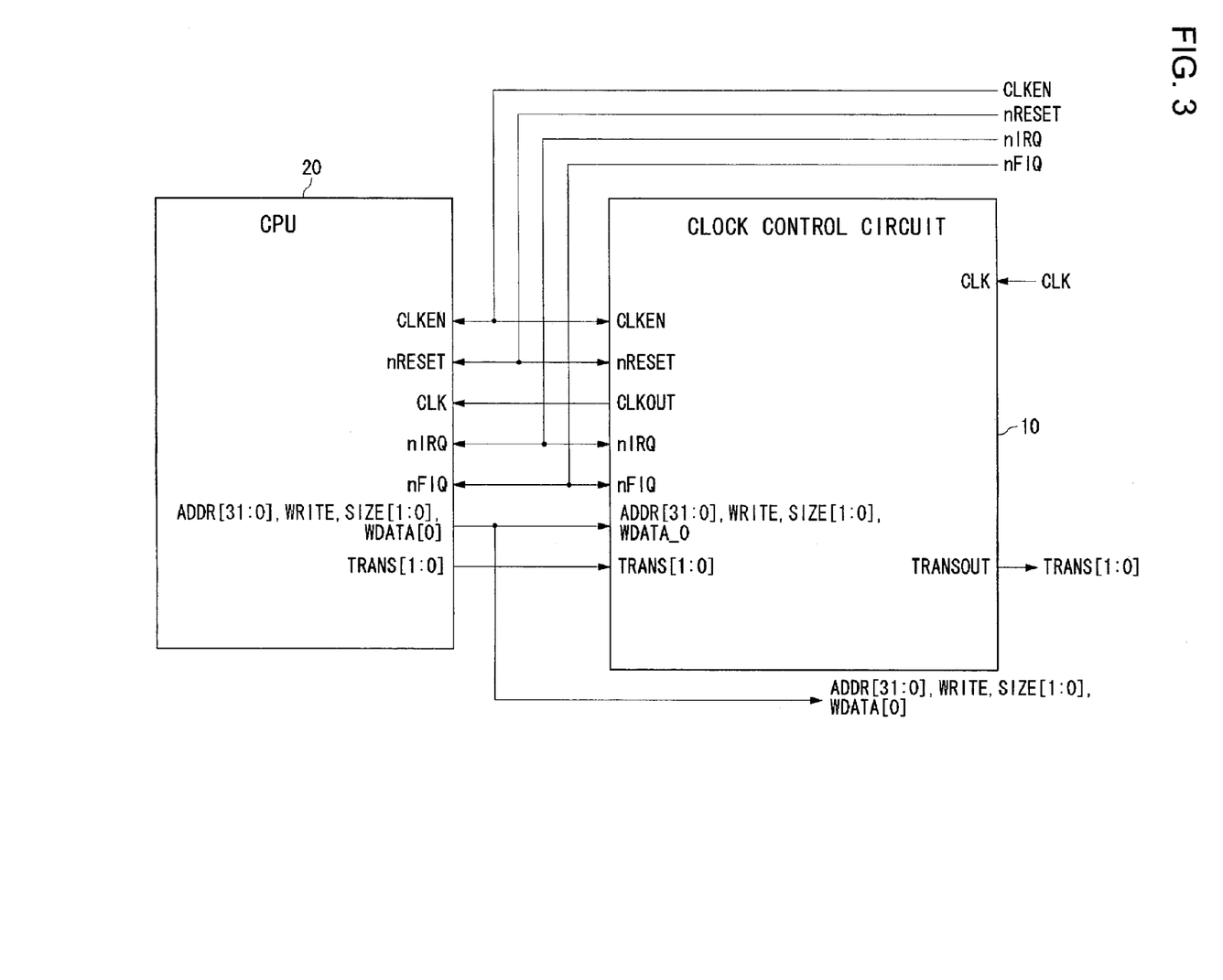
FIG. 3 shows the signal connection between the clock control circuit and the central processing unit according to one embodiment of the present invention.

FIG. 3 is a signal connection diagram between clock control circuit 10 and CPU 20. The signals described in FIG. 1 are interconnected between the clock control circuit 10 and CPU 20. Several signals are connected to external circuits. For example, CLKEN, nRESET, nIRQ and nFIQ are inputted from an external circuit to the clock control circuit 10 and CPU 20. CLK is inputted to the clock control circuit 10 only. ADDR[31:0], WRITE, SIZE [1:0] and WDATA [0] are provided to external circuits from the CPU 20.

FIGS. 4 to 7 show circuits inside the clock control circuit 10.

Figure 4:
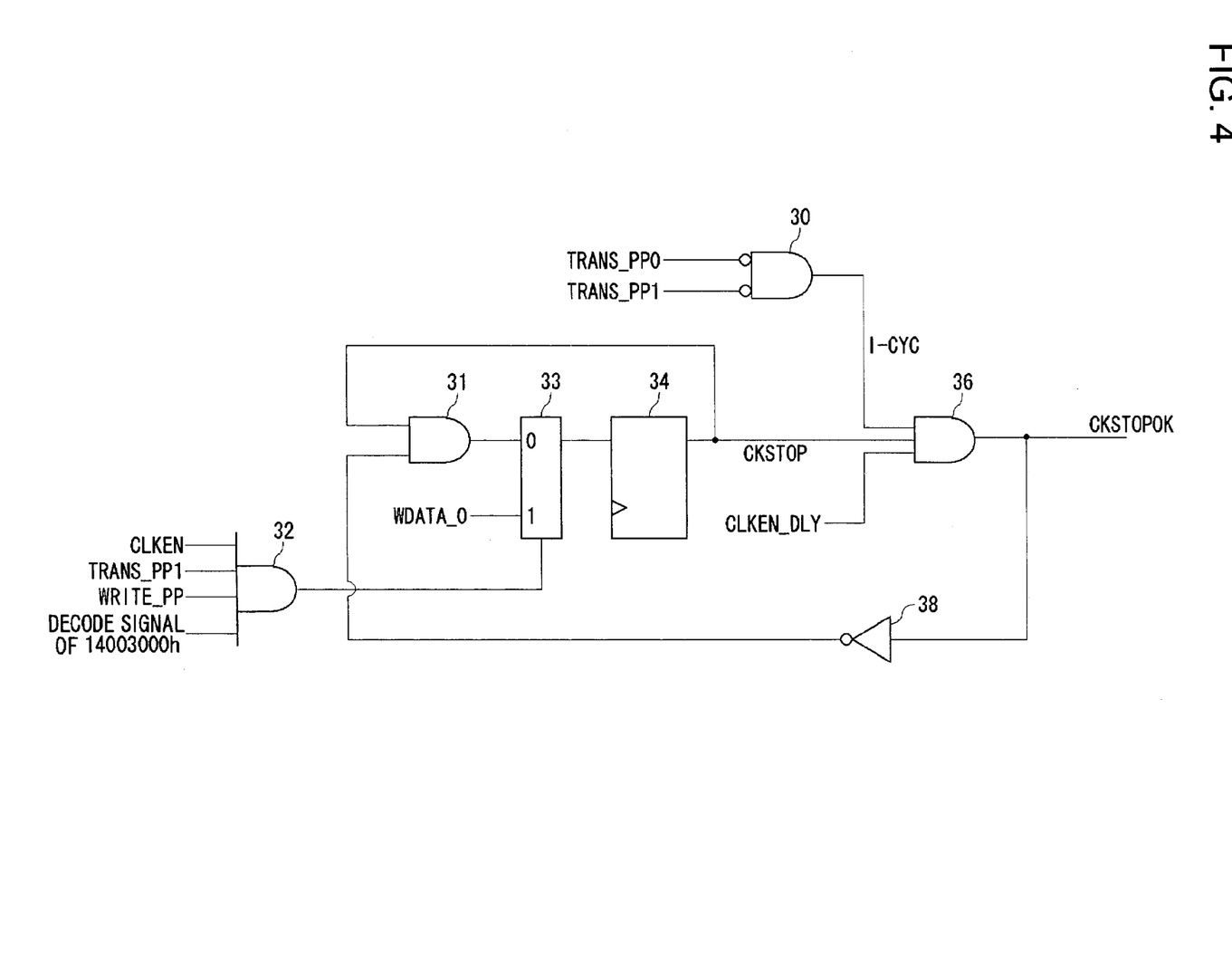
FIG. 4 is a schematic diagram corresponding to an internal cycle detection circuit and a circuit for stopping the clock.
Figure 5:
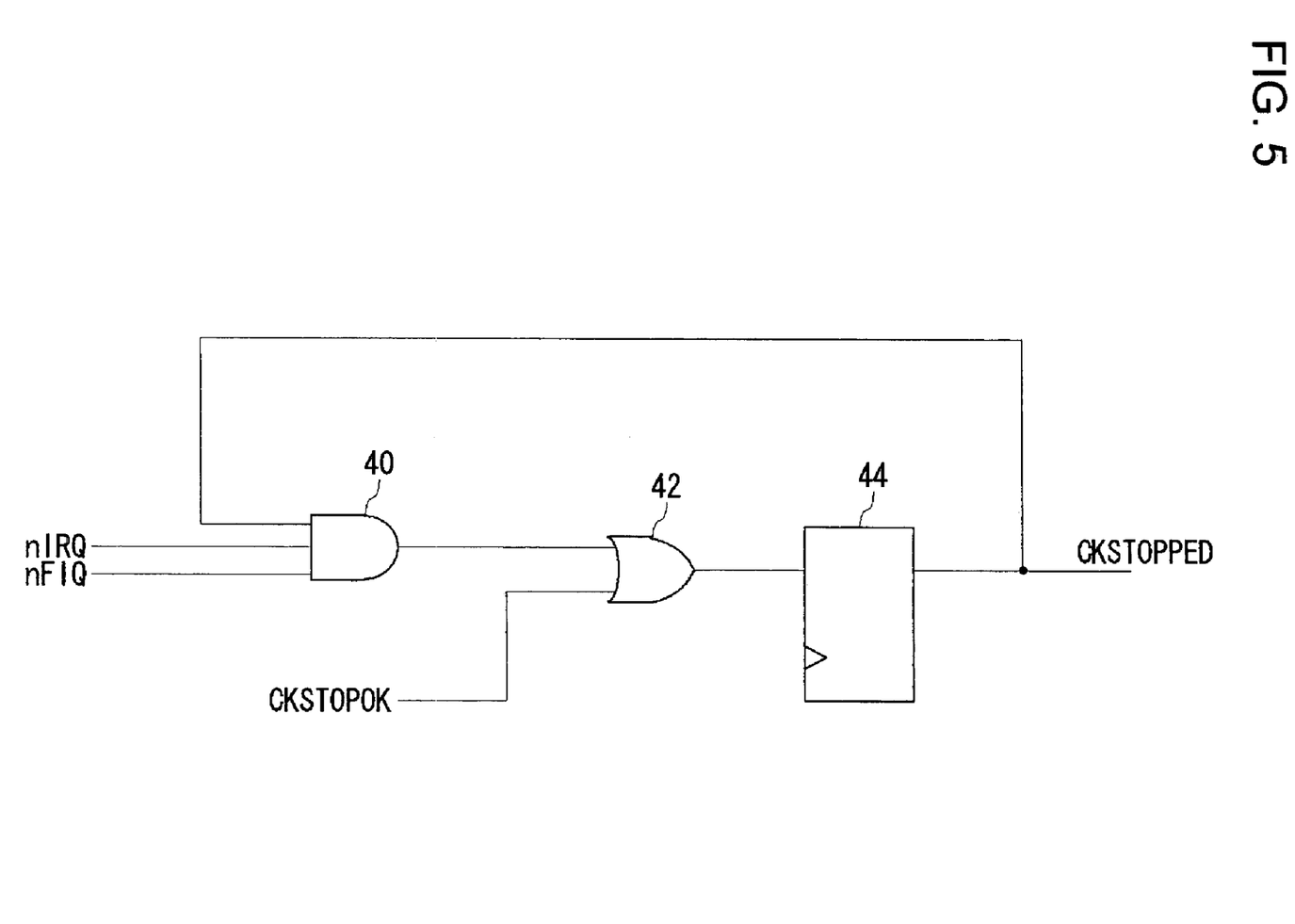
FIG. 5 is a schematic diagram to stop and resume the clock.

FIGS. 4 and 5 correspond to an acknowledge circuit working from the clock stop instruction to the acknowledge of the instruction. As shown in FIG. 4, the decode signal of address '14003000h', WRITE_PP which is a latched signal of WRITE when CLKEN is high, by D type flip-flop or DFF, CLKEN, and TRANS_PP1 described later are inputted to an AND 32. The output of the AND 32 is the select signal of a selector 33. When the select signal is '0', the output of an AND 31 is selected and when the select signal is '1', WDATA_0 is selected. The selected signal is connected to the data input of a DFF 34. The DFF 34 acts as the 'clock stop instruction register'. Hereinafter, unless otherwise described, nRESET signal is inputted to the reset pins and CLK is inputted to the clock input pins of DFFs. The output signal of the DFF 34 is CKSTOP signal. CKSTOP is inputted to one input pin of the AND 31 provided in front of the selector 33. Another input pin of the AND 31 is provided with the inverted signal of CKSTOPOK.

TRANS_PP are latched signals of TRANS when CLKEN is high, by a DFF. The bus cycle of CPU 20 is represented according to the timing of TRANS_PP. TRANS_PP0, 1 are inputted to a NOR 30, and the output of the NOR 30, I-CYC, is inputted to a 3-input AND 36.

I-CYC becomes active when the CPU 20 is in internal cycle. Here, the period when TRANS_PP0, 1 are both 0 is defined as an internal cycle.

The other two inputs of the AND 36 are CKSTOP and CLKEN_DLY which is a delayed signal of CLKEN by a DFF. The output of the AND 36 is CKSTOPOK. This signal becomes active only during the first one clock period during the process where the clock is effectively stopped thereby showing the start of the clock stop. CKSTOP is inputted to an inverter 38, and the output thereof is inputted to the AND 31. The DFF 34 is therefore set with WDATA_0 when written from the CPU 20. Otherwise, if CKSTOPOK is high, the DFF 34 is set with '0', and if not, DFF 34 preserves the previous value. The logic AND of I-CYC and CLKEN_DLY realized by the 3-input AND 36 indicates the state where 'the cycle shown by TRANS was an internal cycle I and CLKEN was high in the preceding cycle'. This circuit is used to know in the cycle C4 that the above condition was met in the cycle C3 in FIG. 8 described later.

FIG. 5 is a circuit to generate CKSTOPPED which stays active while the clock is stopped, after receiving CKSTOPOK. nIRQ, nFIQ and CKSTOPPED are inputted to a 3-input AND 40. The output of the AND 40 becomes one input to an OR 42. CKSTOPOK is inputted to the other input of the OR 42. The output of the OR 42 is held for one clock period by a DFF 44 and becomes CKSTOPPED. Because CKSTOPOK can continuously be high only for one clock period, when either of nTRQ and nFIQ is asserted and the output of the 3-input AND 40 becomes low, CKSTOPPED becomes low promptly. As a result, the clock stop state is cancelled and normal operation is resumed.

Figure 6:
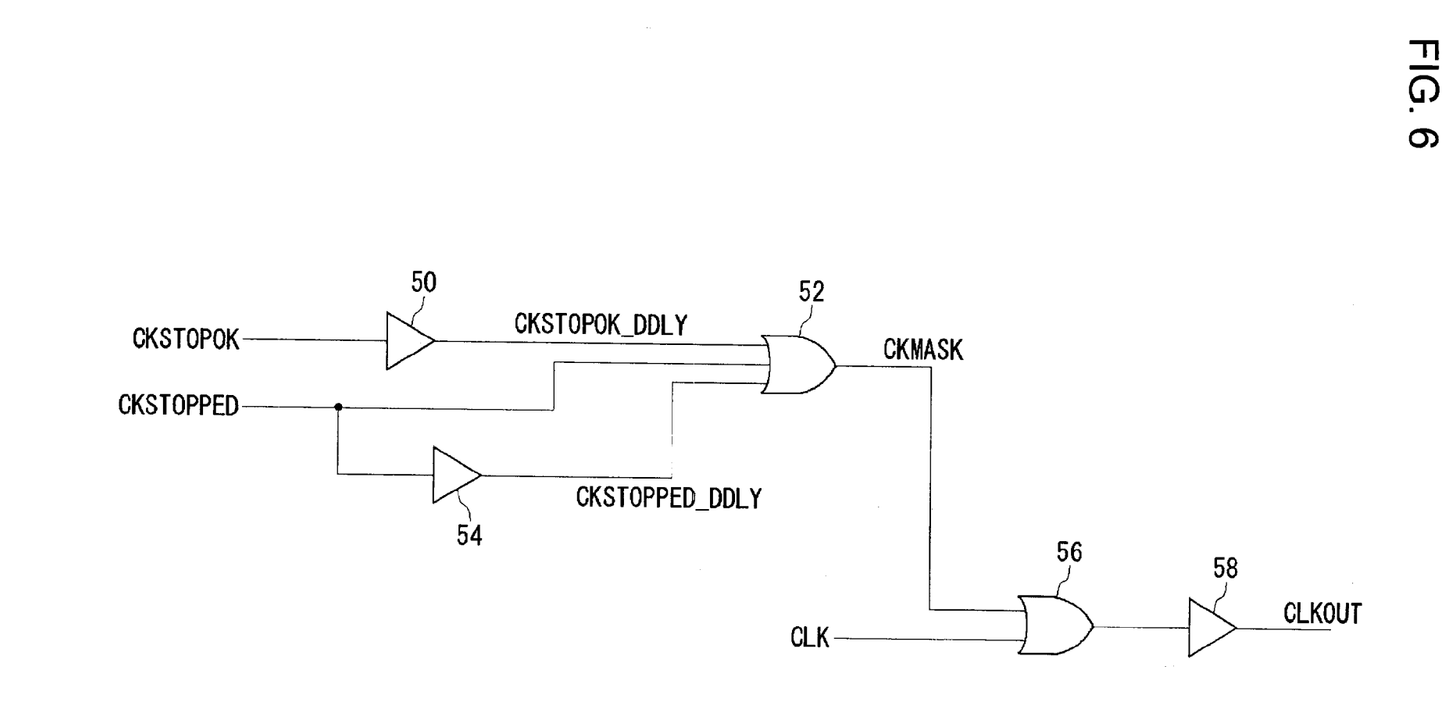
FIG. 6 is a schematic diagram for outputting the clock.

FIG. 6 shows the configuration of a clock output circuit which stops the clock for the CPU 20 after the internal cycle of the CPU 20 is detected. CKSTOPOK becomes CKSTOPOK_DDLY via a delay gate 50. CKSTOPPED becomes CKSTOPPED_DDLY via a delay gate 54. The delay amount of these gates is described later. The two delay signals and CKSTOPPED are inputted to a 3-input OR 52, and the output of the OR 52, CKMASK, is inputted together with CLK to a 2-input OR 56. The output of the OR 56 is outputted to the CPU 20 as CLKOUT via an output buffer 58. CKMASK is a signal to mask or stop the clock.

Figure 7:
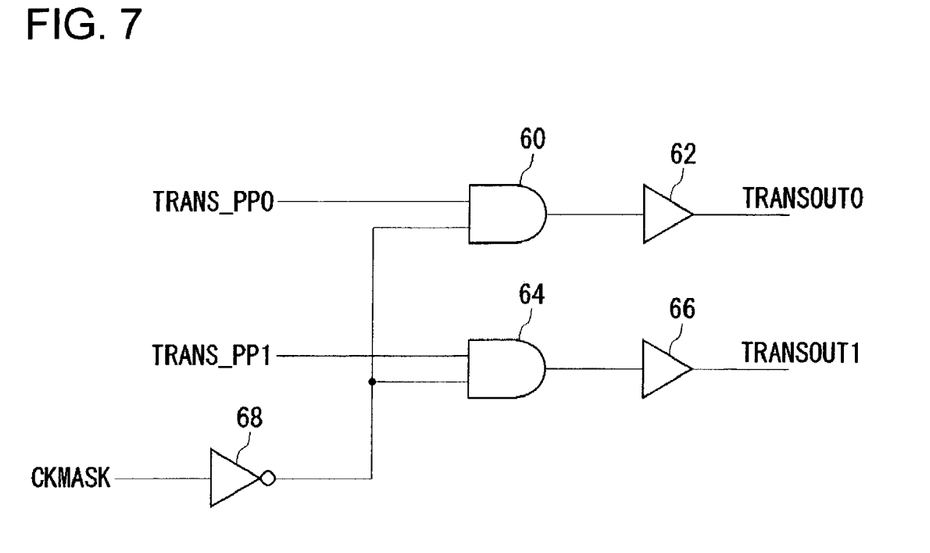
FIG. 7 is a schematic diagram to generate the signals representing transfer types to view externally of the central processing unit and the clock control circuit.

FIG. 7 is a circuit to generate TRANSOUT used outside. TRANS_PP0, 1 are inputted to one input pin of 2-input AND 60, 64, respectively. The other input pins of the 2-input AND 60, 64 are provided with the inverted signal of CKMASK by an inverter 68. The output signals of the AND 60, 64 are outputted to external circuit as TRANSOUT0, 1 via output buffers 62, 66, respectively. The CPU 20 represents its bus cycle by TRANS. In this embodiment, however, the CPU 20 and the clock control circuit 10 are viewed externally and the bus cycle realized by these two components is represented by TRANSOUT.

The operation to stop and resume the clock is as follows. Clock stop operation is conducted by a program of the CPU 20. When a software interrupt is occurred, the state of status registers, registers used in the software interrupt handler and a link register showing the return address is stored in a stack memory. During the software interrupt process, nIRQ is automatically disabled. nFIQ is, on the other hand, disabled beforehand in order to avoid an undesirable clock stop caused by nFIQ during the interrupt process before the complete stop of the clock. After nFIQ has been disabled, '1' is written in the clock stop instruction register. The clock control circuit 10 stops the clock according to the instruction. CLKOUT is fixed high. During the stop clock period, TRANSOUT0,1 are fixed so that the bus cycle viewed outside the CPU 20 and the clock control circuit continues to be the internal cycle. By pretending to be the internal cycle, malfunction such as unexpected access to outside from the CPU 20 is avoided.

The clock restart process is initiated by either of nFIQ or nIRQ. The status and values of the status registers and other registers are read from the stack memory and the process returns from the software interrupt handler. The enable/disable state of nFIQ and nIRQ becomes back to the original state before the software interrupt has been initiated, by the mechanism of the CPU 20 automatically. When the interrupt is not prohibited, therefore, interrupt is handled. The clock is resumed even when the interrupt is prohibited from the beginning.

Figure 8:
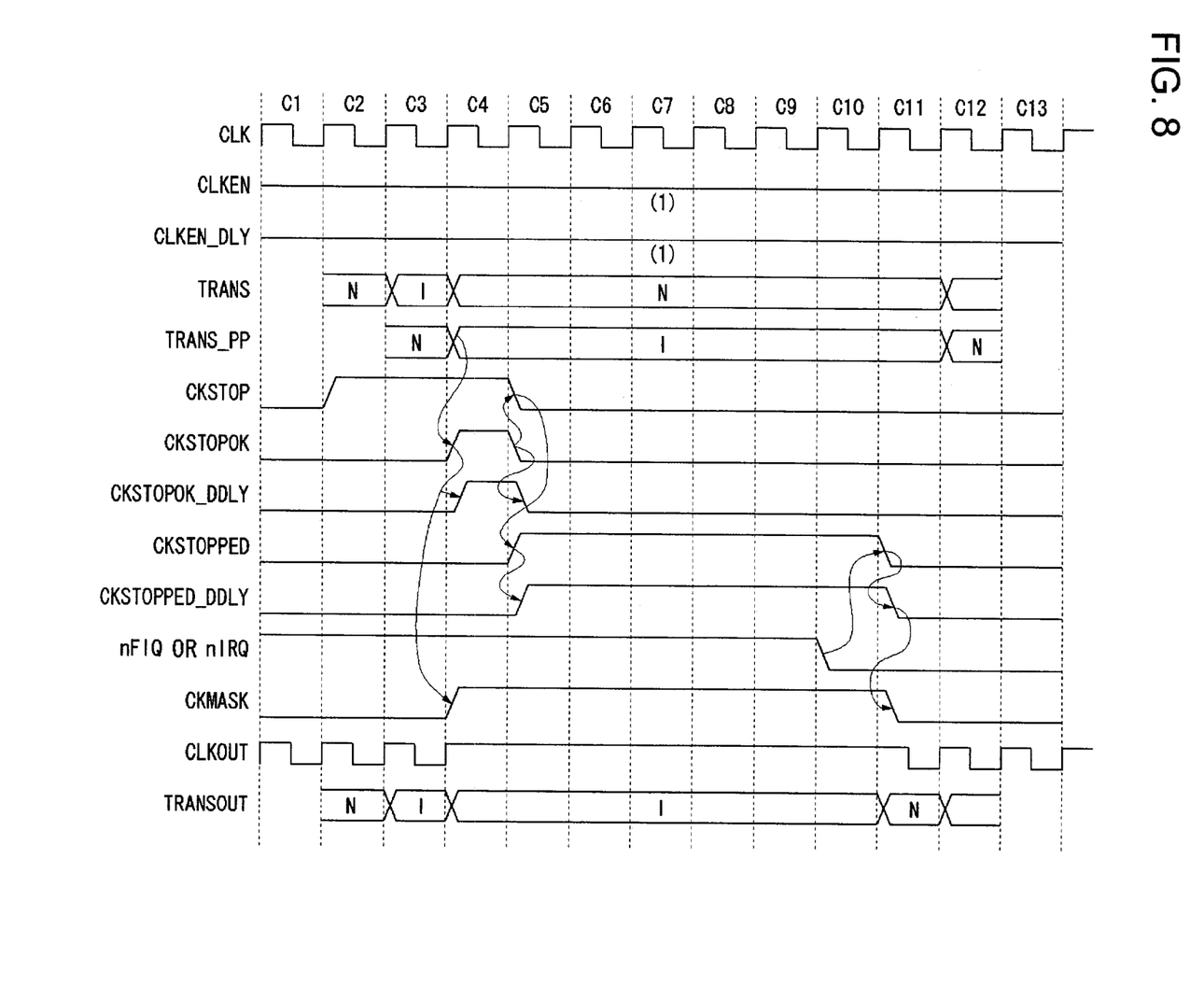
FIG. 8 is a timing chart showing the process of the clock control circuit according to one embodiment of the present invention.

FIG. 8 is a timing chart for the stop and resumption of the clock by the clock control circuit 10. In this figure, C1–C13 stand for clock cycles. 'N' shown on TRANS corresponds to a cycle in which access is made by the CPU 20 to a certain address generating a bus access. 'I' shows an internal cycle of the CPU 20. The internal cycle for example corresponds to multiply instruction operation conducted inside the CPU 20. This signal becomes TRANS_PP latched by a DFF when CLKEN is high. The periods of 'N' and 'I' represented by TRANS_PP correspond to the periods of actual bus cycles.

In FIG. 8, CKSTOP changes to high in the period C2. This change shows that the write of '1' to the clock stop instruction register is occurred. The periods C1, C2 are therefore in the interrupt routine.

CKSTOPOK then becomes high in the period C4 by the circuit shown in FIG. 4. This corresponds to the change of TRANS_PP to 'I' in this period. CKSTOP becomes low at the beginning of the period C5 as CKSTOPOK becomes high.

CKSTOPPED becomes high in the period of C5 after CKSTOPOK becomes high by the circuit shown in FIG. 5. The delayed signal of CKSTOPPED is CKSTOPPED_DDLY. CKSTOPPED becomes low at the beginning of the period of C11 by the circuit shown in FIG. 5 when either of nFIQ or nIRQ is asserted at the beginning of the period of C10. As a result, CKMASK stays high between the period C4 to C10 and CLKOUT is fixed high.

In this embodiment, delay is carefully designed not to cause a timing hazard for clock masking. T1 stands for the maximum delay of the paths starting from all CLKs of all DFFs which become the starting points of timing paths reaching CKSTOPOK to CLKOUT via the DFFs of starting points and CKSTOPOK_DDLY.

$T1 < (period\ when\ CLK\ is\ high) - (skew)$ is met by circuit design. T2 stands for the maximum delay of the paths starting from CLK of DFF 44 via CKSTOPPED ending at CKMASK, except for the path through the delay gate 54 for CKSTOPPED_DDLY. T3 stands for the minimum delay of the paths starting from CLKs of all DFFs which become the starting points to reach CKSTOPOK ending at CKMASK via the DFFs of starting points and CKSTOPOK.

$T2 < T3 - (skew)$ is met by circuit design. T4 stands for the maximum delay of the paths starting from CLK ending at CLKOUT only via the OR 56 of FIG. 6 and the output buffer 58. T5 stands for the minimum delay of paths starting from CLK of the DFF 44 via the delay gate 54 of CKSTOPPED_DDLY ending at CLKOUT.

$T4 < T5 - (skew)$ is met by circuit design. The described timing design avoids the timing hazard. Here, 'skew' appears inside the clock control circuit 10.

In the above embodiment, the clock is stopped by writing '1' to the clock stop instruction register. The clock may be stopped, however, triggered by any other hardware or software events.

Although the present invention has been described by way of exemplary embodiments, it should be understood that many changes and substitutions may be made by those skilled in the art without departing from the spirit and the scope of the present invention which is defined only by the appended claims.

What is claimed is:

1. A clock control circuit connected to, and providing a clock to, a central processing unit, comprising:
    a detector which detects that a cycle of the central processing unit becomes an internal cycle after the central processing unit has executed an instruction to write data in a predetermined address; and
    a clock output unit which stops the clock to the central processing unit after the detection of said internal cycle, wherein
    the instruction is executed in an interrupt routine initiated by a software interrupt to the central processing unit,
    the clock control circuit further comprising a circuit which outputs a signal representing a bus cycle of the central processing unit to indicate that the central processing is in the internal cycle, while the clock is stopped.

2. A clock control method to provide a clock from a clock control circuit to a central processing unit, comprising:
    detecting that a cycle of the central processing unit becomes an internal cycle after the central processing unit has executed an instruction to write data in a predetermined address; and
    stopping the clock to the central processing unit after the detection of said internal cycle,
    wherein the instruction is executed in an interrupt routine which is initiated by a software interrupt to the central processing unit, and
    a signal representing a bus cycle of the central processing unit is outputted from the clock control circuit to indicate that the central processing is in the internal cycle, while the clock is stopped.

* * * * *